United States Patent [19]
Herold et al.

[11] Patent Number: 6,158,218
[45] Date of Patent: Dec. 12, 2000

[54] SUPERCHARGEABLE INTERNAL COMBUSTION ENGINE WITH CYLINDER CUT-OFF

[75] Inventors: Armin Herold, Murrhardt; Peter Lückert, Waiblingen, both of Germany

[73] Assignee: DaimlerChrysler AG, Stuttgart, Germany

[21] Appl. No.: 09/351,177

[22] Filed: Jul. 12, 1999

[30] Foreign Application Priority Data

Jul. 12, 1999 [DE] Germany .............................. 198 31 251

[51] Int. Cl.[7] ................................................... F02B 33/44

[52] U.S. Cl. ...................... 60/609; 123/198 F; 123/559.1

[58] Field of Search ............................. 123/198 F, 559.1, 123/559.3, 562; 60/609

[56] References Cited

FOREIGN PATENT DOCUMENTS

3309434 C1  3/1983  Germany .
3633405 A1  4/1988  Germany .

*Primary Examiner*—Naoh P. Kamen
*Attorney, Agent, or Firm*—Evenson, McKeown, Edwards & Lenehan, P.L.L.C.

[57] ABSTRACT

A superchargeable internal combustion engine with cylinder cut-off has a first cylinder group which operates over the entire operating range of the internal combustion engine. A second cylinder group is cut off or connected up as a function of demand. The engine's response dynamics when the second cylinder group is connected up by providing an exhaust-gas turbocharger which is used exclusively for supercharging the first cylinder group. A mechanical supercharger is provided which is used exclusively for supercharging the second cylinder group.

17 Claims, 3 Drawing Sheets

SUPERCHARGEABLE INTERNAL COMBUSTION ENGINE WITH CYLINDER CUT-OFF

BACKGROUND OF THE INVENTION

This application claims the priority of 198 31 251.2-13, filed Jul. 11, 1998, the disclosure of which is expressly incorporated by reference herein.

The present invention relates to a superchargeable internal combustion engine with cylinder cut-off, in which a first cylinder group operates over the entire operating range of the internal combustion engine and a second cylinder group can be connected up as required.

In order to reduce the fuel consumption, particularly in powerful internal combustion engines of commercial vehicles, these internal combustion engines can be equipped with cylinder cut-off. One group of cylinders can be connected up or cut off as a function of the output. Inasmuch as modern internal combustion engines are also optimized with respect to their pollutant emissions such that they have minimum emission values in a relatively high load range, the cylinder cut-off is also used for pollutant reduction because the cut-off cylinders do not produce any pollutants. As a result of the cut-off, the cylinders which are not cut off are more severely loaded and are able to operate in the optimized-emission high load range. In these internal combustion engines as disclosed for example, in DE 33 09 434 C1, only some of the cylinders are then involved in the development of the output, for example when starting or during idling and during part-load operation.

In addition, DE 36 33 405 A1 discloses an internal combustion engine of the above-mentioned type which has a first cylinder group which operates over the entire operating range of the internal combustion engine, and a second cylinder group which is cut off in part-load ranges and can be connected up as required, a separate exhaust-gas turbocharger additionally being assigned to each cylinder group in order to increase the output of the internal combustion engine. The turbocharger assigned to the first cylinder group is driven by the exhaust gases of the first cylinder group, while the other turbocharger serving to supercharge the second cylinder group is driven by the exhaust gases of the second cylinder group.

At a transition from part-load operation, in which the second cylinder group is cut off, to full-load operation, in which all the cylinders of the known internal combustion engine operate, the cylinders of the second cylinder group initially require a start-up phase, during which the associated exhaust-gas turbocharger also begins operation. Because the turbines of the exhaust-gas turbocharger can develop their output only above a specific flow velocity, the increase in output as a result of the supercharging of the charging air for the second cylinder group begins only after a noticeable time delay. An internal combustion engine of this type, which is supercharged by two exhaust-gas turbochargers, therefore has a sluggish response when the second cylinder group is connected up.

SUMMARY OF THE INVENTION

An object of the present invention is to provide an improved internal combustion engine in terms of its response when connecting up the second cylinder group.

According to the invention, this object has been achieved by an internal combustion engine in which an exhaust-gas turbocharger is provided which is used exclusively for supercharging the first cylinder group, and in that a mechanical supercharger is provided which is used exclusively for supercharging the second cylinder group.

The invention is based on the general recognition of the desirability of supercharging the continuously operating cylinders of the first cylinder group with a conventional exhaust-gas turbocharger, and of providing a conventional mechanical supercharger for supercharging the cylinders of the second cylinder group, which can be connected up as a function of the demand.

The use of a conventional mechanical supercharger has the advantageous effect of a noticeable supercharging and increase in output of the cylinders connected up of the second cylinder group, even at low rotational speeds or directly after the said mechanical supercharger has been connected up. It is therefore possible for the cylinders which can be connected up to develop the necessary output immediately after they are connected up. The internal combustion engine designed in accordance with the invention thus exhibits good response dynamics, so that the required additional output is available virtually without any time delay.

According to an advantageous embodiment of the internal combustion engine according to the invention, the mechanical supercharger can be disconnectably coupled to a drive train of the internal combustion engine which is driven even when the second cylinder group is cut off. The effect of this measure is that the mechanical supercharger can be cut off in the part-load range, with the result that no unnecessary power then has to be consumed in order to drive the unneeded supercharger. In addition, the coupling to a drive train of the internal combustion engine which is driven even when the second cylinder group is cut off offers the possibility that the mechanical supercharger brings about effective supercharging of the charging air for the cylinders of the second cylinder. group immediately after it has been connected up.

On the basis of the configuration of the internal combustion engine according to the present invention, the exhaust-gas turbocharger can be sized to match the throughput of the total swept volume of the first cylinder group. As a result, the first cylinder group exhibits maximum development of output over a wide operating range of the internal combustion engine.

In a similar manner, the mechanical supercharger can be sized to match the throughput of the total swept volume of the second cylinder group. Consequently, maximum development of output from both cylinder groups can be ensured in the full-load range.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
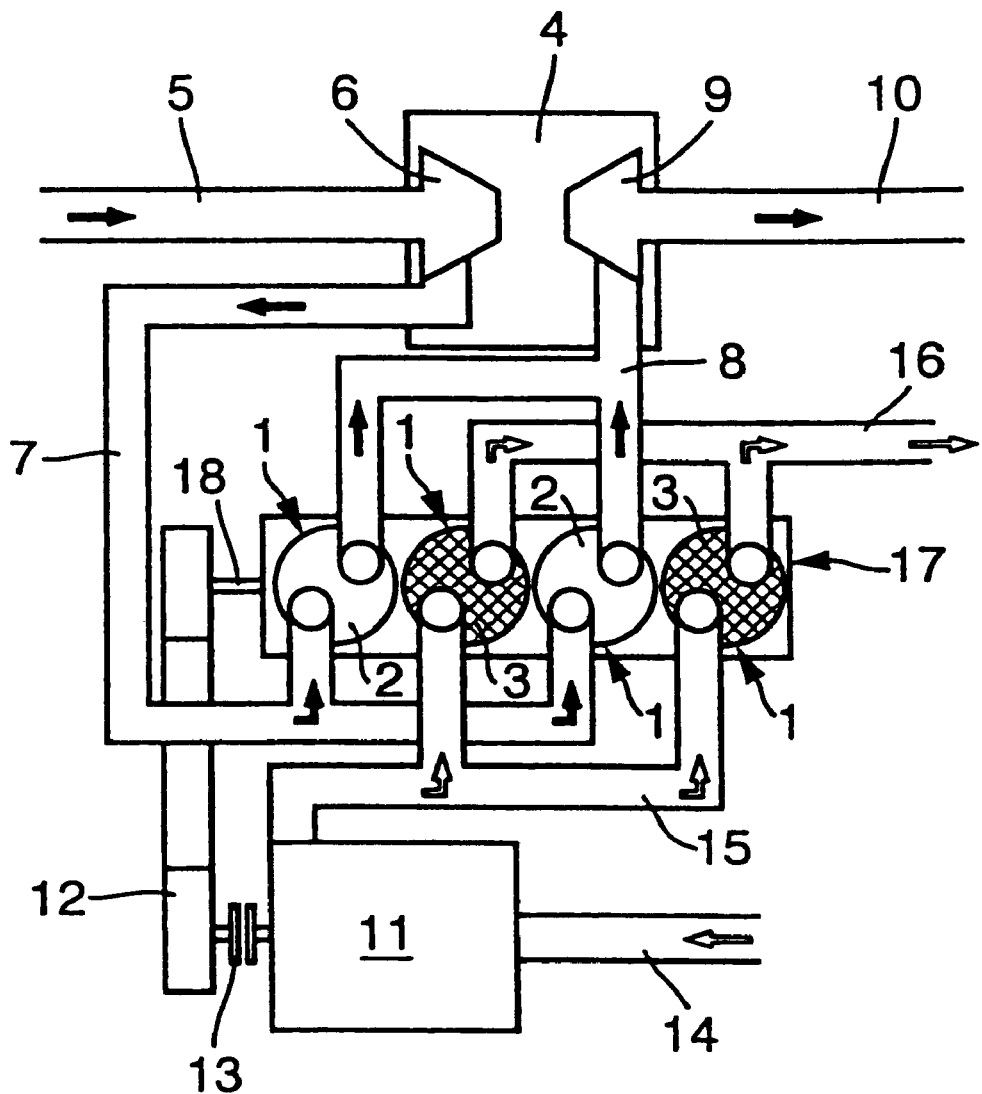
FIG. 1 is a basic schematic view of an internal combustion engine according to the present invention having four cylinders arranged in one row.
Figure 2:
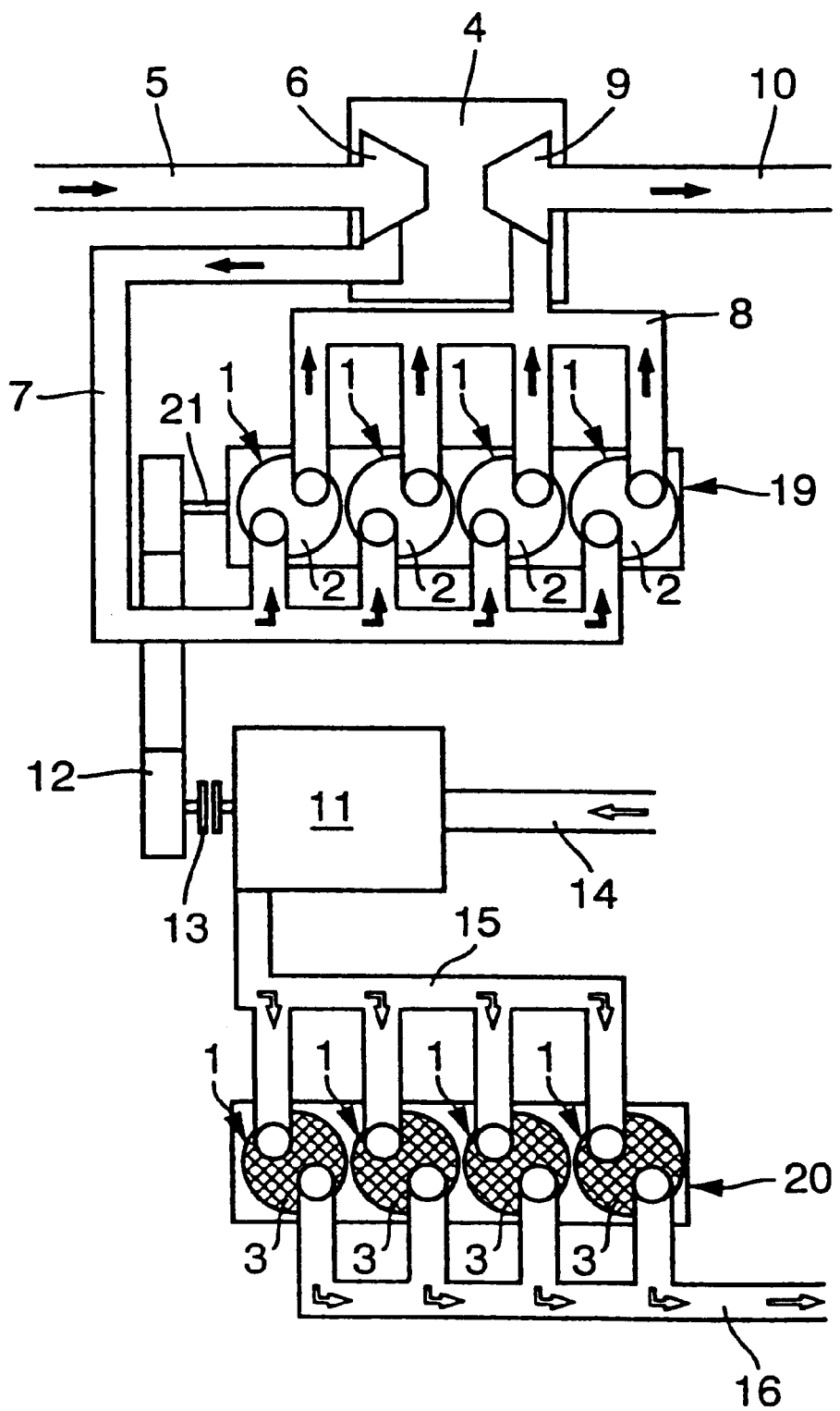
FIG. 2 is a basic schematic view of another embodiment of the internal combustion engine according to the invention having eight cylinders arranged in two rows of four cylinders each.
Figure 3:
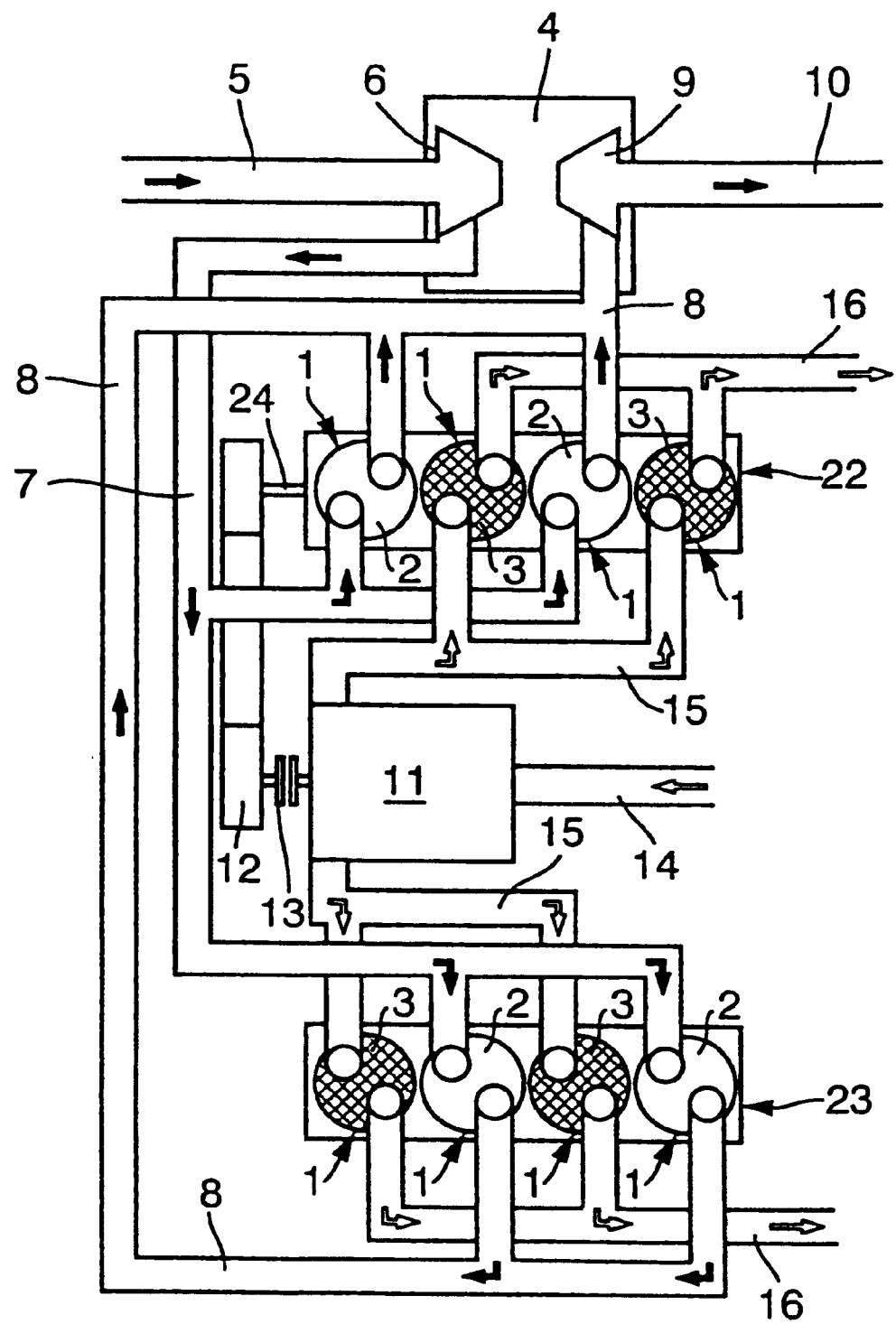
FIG. 3 is a basic schematic view of a further embodiment of the internal combustion engine according to the present invention having eight cylinders arranged in two rows of four cylinders respectively.

According to FIGS. 1 through 3, an internal combustion engine according to the invention has a number of cylinders designated generally by numeral 1, which are divided into a first cylinder group, whose cylinders 2 are illustrated without hatching, and a second cylinder group, whose cylinders 3 are shown hatched.

The cylinders 2 of the first cylinder group operate in all the operating phases of the internal combustion engine. By contrast, the cylinders 3 of the second cylinder group can be cut off or connected up as required. The cylinders 3 which can be cut off are cut off, for example, in part-load operation, during braking operation, during idling or when the internal combustion engine is being started, in order, on one hand, to save fuel and, on the other hand, at least in the case of diesel engines, to reduce the hydrocarbon emissions. This emission reduction results because cutting off the cylinders 3 of the second cylinder group means that the cylinders 2 of the first cylinder group which are not cut off are loaded more severely. As a result, the cylinders 2 can operate in an operating range which is optimized with respect to pollutant emission values.

The cylinders 2 of the first cylinder group are supercharged with the aid of an exhaust-gas turbocharger 4. Fresh air is taken in via a first intake line 5, is compressed in a compressor 6 of the exhaust-gas turbocharger 4 and brought to the pressure level of the charging air. Downstream of the compressor 6 of the exhaust-gas turbocharger 4, the charging air produced is fed via a first charging-air line to the cylinders 2 of the first cylinder group. Following combustion, the exhaust gases are fed via a first exhaust-gas line 8 to a turbine 9 of the exhaust-gas turbocharger 4, in which they are expanded. After the turbine 9 of the exhaust-gas turbocharger 4, the expanded exhaust-gases are led with the aid of a line 10, for example to an exhaust-gas train (not shown). The turbine 9 driven by the exhaust gases in turn drives the compressor 6.

The flow direction of the gases in the first intake line 5, in the first charging-air line 7, in the first exhaust-gas line 8 and in the line 10 is symbolized by solid arrows.

A mechanical supercharger 11 is provided for supercharging the cylinders 3 of the second cylinder group. The mechanical supercharger 11 is coupled to a drive train 12 of the internal combustion engine, so that the supercharger 11 can be driven by this drive train 12. The drive train 12 is coupled to the internal combustion engine such that it exhibits or can output drive power even when the cylinders 3 of the second cylinder group are cut off. The mechanical supercharger 11 is coupled to the drive train 12 via a switchable clutch 13, by which the mechanical supercharger 11 can be switched on and off.

The drive train 12 usually drives further units (not illustrated) of the internal combustion engine, such as an alternator or a water pump. If the drive train 12 is provided exclusively for driving the mechanical supercharger 11, the clutch 13 can also be arranged on the input side of the drive train 12, instead of on the drive train's output side.

When the mechanical supercharger 11 is switched on, fresh air is taken therein via a second intake line 14. This air is compressed in the mechanical supercharger 11 and supercharged to form charging air, which is fed to the cylinders 3 of the second cylinder group via a second charging-air line 15. In the embodiment shown in FIG. 3, two second charging-air lines 15 are provided.

Following combustion in the cylinders 3 of the second cylinder group, the exhaust gases are collected in a second exhaust-gas line 16 and are led to an exhaust-gas purification device (not shown). The embodiment shown in FIG. 3 has two second exhaust-gas lines 16. The exhaust gases of the cylinders 2 of the first cylinder group and the cylinder 3 of the second cylinder group are preferably cleaned in a common exhaust-gas purification device.

The flow direction of the gases in the second intake line 14, in the second charging-air line 15 and in the second exhaust-gas line 16 is symbolized by arrows illustrated only in their outline.

According to FIG. 1, the internal combustion engine according to the invention is shown, in a first embodiment, as a four-cylinder in-line engine. The cylinders 1 in one row 17 are alternately assigned to the first cylinder group and the second cylinder group. A different assignment or division of the cylinders 1 is also contemplated.

The drive train 12 provided for driving the mechanical supercharger 11 is driven permanently via a schematically shown crankshaft 18 of the cylinder row 17. This ensures that the drive train 12 can make drive power available even when the cylinders 3 of the second cylinder group are cut off. Because of this arrangement, the cut-off cylinders 3 can be quickly connected up with a high output when required. It is thus possible for the required charging pressure to be built up without a long time delay by the mechanical supercharger 11, which is then connected up via the clutch 13, so that the cylinders 3 which have been connected up can very quickly furnish the required additional output. The internal combustion engine according to the invention therefore has particularly good response dynamics when the cylinders 3 which can be cut off are connected up.

FIG. 2 shows an embodiment of the internal combustion engine according to the present invention in which eight cylinders 1 are arranged in two rows 19, 20. An eight-cylinder engine of this type is preferably configured as a V engine, with the rows of cylinders 19, 20 then usually being referred to as the first cylinder bank 19 and second cylinder bank 20).

In this embodiment, the cylinders 2 of the first cylinder group are assigned to the first row of cylinders or first cylinder bank 19, and the cylinders 3 of the second cylinder group which can be cut off are assigned to the second row of cylinders or the second cylinder bank 20. The drive train 12 is driven via a symbolically illustrated crankshaft 21 of the first cylinder bank 19. This ensures that a drive force for driving the mechanical supercharger 11 can be made available continuously.

A third embodiment of the internal combustion engine according to the invention is illustrated in FIG. 3. As in the embodiment according to FIG. 2, this third embodiment is an eight-cylinder engine having cylinders 1 arranged in two rows 22, 23 or, in the example of a V engine, in two cylinder banks 22, 23. By contrast with the embodiment illustrated in FIG. 2, however the embodiment shown in FIG. 3, continuously active cylinders 2 and also cylinders 3 which can be cut off are arranged in each row of cylinders or cylinder bank 22, 23.

In the embodiment illustrated in FIG. 3, the cylinders 3 which can be cut off in the first cylinder bank 22, and the cylinders 3 which can be cut off in the second cylinder bank 23 are supplied with charging air using separate second charging-air lines 15.

Also contemplated is an embodiment in which a central second charging-air line is branched in an appropriate way. In addition, the exhaust gases of the cylinders which can be cut off in the two cylinder banks 22, 23 are discharged using two second exhaust-gas lines 16, which can, in particular, be led together.

In the embodiment shown in FIG. 3, the drive train 12 used for driving the mechanical supercharger 11 is driven by a symbolically illustrated crankshaft 24 of one of the two rows of cylinders 22 or 23, here by the row of cylinders 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A superchargeable internal combustion engine with cylinder cut-off, comprising a first cylinder group which operates over an entire operating range of the internal combustion engine, a second cylinder group which is cut off or connected up as a function of demand, an exhaust-gas turbocharger which is operatively arranged exclusively for supercharging the first cylinder group, and a mechanical supercharger is operatively arranged exclusively for supercharging the second cylinder group.

2. The internal combustion engine according to claim 1, wherein the mechanical supercharger is disconnectably couplable to a drive train of the internal combustion engine which is arranged to be driven even when the second cylinder group is cut off.

3. The internal combustion engine according to claim 2, wherein the mechanical supercharger is couplable to the drive train by a switchable clutch.

4. The internal combustion engine according to claim 1, wherein the first cylinder group has a first charging-air feed and a first exhaust-gas discharge, and the second cylinder group has a second charging-air feed and a second exhaust-gas discharge.

5. The internal combustion engine according to claim 4, wherein the mechanical supercharger is disconnectably couplable to a drive train of the internal combustion engine which is arranged to be driven even when the second cylinder group is cut off.

6. The internal combustion engine according to claim 5, wherein the mechanical supercharger is couplable to the drive train by a switchable clutch.

7. The internal combustion engine according to claim 5, wherein the mechanical supercharger is disconnectably couplable to a drive train of the internal combustion engine which is arranged to be driven even when the second cylinder group is cut off.

8. The internal combustion engine according to claim 7, wherein the mechanical supercharger is couplable to the drive train by a switchable clutch.

9. The internal combustion engine according to claim 1, wherein the internal combustion engine has cylinders arranged in two rows, a first row of the cylinders containing the first cylinder group, and a second row of cylinders containing the second cylinder group.

10. The internal combustion engine according to claim 9, wherein the first cylinder group has a first charging-air feed and a first exhaust-gas discharge, and the second cylinder group has a second charging-air feed and a second exhaust-gas discharge.

11. The internal combustion engine according to claim 1, wherein the exhaust-gas turbocharger is dimensioned with respect to a total swept volume of the first cylinder group.

12. The internal combustion engine according to claim 1, wherein the mechanical supercharger is dimensioned with respect to a total swept volume of the second cylinder group.

13. The internal combustion engine according to claim 12, wherein the exhaust-gas turbocharger is dimensioned with respect to a total swept volume of the first cylinder group.

14. The internal combustion engine according to claim 13, the mechanical supercharger is disconnectably couplable to a drive train of the internal combustion engine which is arranged to be driven even when the second cylinder group is cut off.

15. The internal combustion engine according to claim 14, wherein the mechanical supercharger is couplable to the drive train by a switchable clutch.

16. The internal combustion engine according to claim 15, wherein the first cylinder group has a first charging-air feed and a first exhaust-gas discharge, and the second cylinder group has a second charging-air feed and a second exhaust-gas discharge.

17. The internal combustion engine according to claim 16, wherein the internal combustion engine has cylinders arranged in two rows, a first row of the cylinders containing the first cylinder group, and a second row of cylinders containing the second cylinder group.

* * * * *